(12) United States Patent
Kobler et al.

(10) Patent No.: US 10,651,695 B2
(45) Date of Patent: May 12, 2020

(54) DISC ROTOR MOTOR

(71) Applicant: Miba Sinter Austria GmbH, Laakirchen (AT)

(72) Inventors: Ralf Kobler, Linz (AT); Dietmar Andessner, Offenhausen (AT); Christian Sandner, Gmunden (AT)

(73) Assignee: Miba Sinter Austria GmbH, Laakirchen (AT)

(*) Notice: Subject to any disclaimer, the term of this patent is extended or adjusted under 35 U.S.C. 154(b) by 602 days.

(21) Appl. No.: 14/460,854

(22) Filed: Aug. 15, 2014

(65) Prior Publication Data
US 2015/0048696 A1    Feb. 19, 2015

(30) Foreign Application Priority Data

Aug. 19, 2013 (AT) ............... A 50510/2013

(51) Int. Cl.
| H02K 1/14 | (2006.01) |
| H02K 21/24 | (2006.01) |
| H02K 1/02 | (2006.01) |
| H02K 1/27 | (2006.01) |
| H02K 9/22 | (2006.01) |

(52) U.S. Cl.
CPC ............... *H02K 1/14* (2013.01); *H02K 1/02* (2013.01); *H02K 1/148* (2013.01); *H02K 1/2793* (2013.01); *H02K 9/22* (2013.01); *H02K 21/24* (2013.01)

(58) Field of Classification Search
CPC .......... H02K 1/44; H02K 1/02; H02K 1/2793; H02K 9/22; H02K 21/24; H02K 1/148; H02K 1/27

USPC ............ 310/44, 216.044, 216.067, 216.113, 310/216.136, 216.137
See application file for complete search history.

(56) References Cited

U.S. PATENT DOCUMENTS

| 3,739,206 | A * | 6/1973 | Schwarzmuller-Joch ................. G04C 13/11 310/162 |
| 6,472,792 | B1 * | 10/2002 | Jack ........................ H02K 1/08 310/216.066 |
| 7,135,800 | B2 * | 11/2006 | Yamada ................. H02K 21/24 310/216.028 |
| 7,375,449 | B2 * | 5/2008 | Butterfield ............... H02K 3/26 310/207 |
| 8,373,326 | B2 * | 2/2013 | Enomoto ............... H02K 1/148 310/156.32 |
| 9,160,219 | B2 * | 10/2015 | Takamatsu ............... H02K 1/02 |
| 2007/0138904 | A1 * | 6/2007 | Chae ..................... H02K 1/148 310/268 |

(Continued)

*Primary Examiner* — Jermele M Hollington
*Assistant Examiner* — Leda T Pham

(57) ABSTRACT

A disc rotor motor is demonstrated, having at least one stator that has at least one electrical stator winding and stator teeth, which have a tooth neck composed of a soft magnetic powder composite, and having at least one disc-shaped rotor, which has permanent magnetic poles composed exclusively of ferrite magnets at least for producing torque, with the rotor and stator oriented parallel to each other and spaced apart from each other by an axial gap. In order to find an optimum between costs, weight, and overall size as well as power and torque density, the invention proposes that the stator teeth each end in a tooth end that adjoins their tooth neck and is composed of a soft magnetic powdered composite, which tooth end widens out in its cross-sectional area in comparison to the tooth neck.

17 Claims, 6 Drawing Sheets

(56) References Cited

U.S. PATENT DOCUMENTS

| | | | |
|---|---|---|---|
| 2009/0273252 A1* | 11/2009 | Nakamasu | H02K 1/2793 |
| | | | 310/156.07 |
| 2010/0148611 A1* | 6/2010 | Wang | H02K 1/14 |
| | | | 310/156.37 |
| 2011/0175497 A1* | 7/2011 | Kawasaki | H02K 1/148 |
| | | | 310/68 R |

* cited by examiner

DISC ROTOR MOTOR

FIELD OF THE INVENTION

The invention relates to a disc rotor motor, having at least one stator that has at least one electrical stator winding and stator teeth, which have a tooth neck composed of a soft magnetic powder composite, and having at least one disc-shaped rotor, which has permanent magnetic poles composed exclusively of ferrite magnets at least for producing torque, with the rotor and stator being oriented parallel to each other and spaced apart from each other by an axial gap.

BACKGROUND OF THE INVENTION

In order to produce a disc rotor motor with reduced material costs, the prior art (author: Sone, Kodai; et. al., title: "A Ferrite PM In-Wheel Motor Without Rare Earth Materials," IEEE Transactions on Magnetics, 48(11): 2961-2964) has disclosed equipping a rotor embodied as a rotor disc exclusively with ferrite magnets in order to thus produce the permanent magnetic poles for torque production. It is therefore possible to avoid the need for permanent magnets made of rare earth, which in addition to reduced costs, also results in disc rotor motors with comparatively low eddy current losses. The rotor, as is customary in disc rotor motors, is oriented parallel to the stator and is spaced apart from the stator by an axial gap. The stator yoke of the stator is made of a soft magnetic powdered composite and forms stator teeth with wound, stub-ended tooth necks. The disadvantages of using inexpensive ferrite magnets are that on the one hand, reduced power densities and on the other, lower torque densities are to be expected. Increased diameters of the rotor disc can in fact compensate for this—but they increase the overall size with regard to the motor diameter, which is comparatively large anyway due to this motor concept. If the amount of available installation space is small, which is one of the challenges, for example, in automotive engineering, then such comparatively inexpensive, but large disc rotor motors are unsuitable.

The object of the invention, therefore, is to modify the design of a disc rotor motor of the type mentioned at the beginning so that despite the ferrite magnets on the rotor, a high power and torque density can be achieved and in addition, small motor dimensions can be maintained in order to permit an installation in a cramped installation space. In addition, the disc rotor motor should have a low weight.

SUMMARY OF THE INVENTION

The invention attains the stated object in that the stator teeth each end at a respective tooth end that adjoins their tooth neck and is composed of a soft magnetic powdered composite, with the tooth end widening out in its cross-sectional area in comparison to the tooth neck.

If the stator teeth each end at a respective tooth end that adjoins the tooth neck and is composed of a soft magnetic powdered composite, which tooth end widens out in its cross-sectional area in comparison to the tooth neck, then despite having a rotor with ferrite magnets, an optimum can be found with regard to the overall size of the disc rotor motor and also with regard to its power and torque density. According to the invention, it is thus possible for the first time, even with ferrite magnets, to advance into the class of disc rotor motors, which according to the prior art, could only be achieved by rotors having permanent magnets made of rare earth. By means of both the stator teeth that widen out toward the end and the particular material (soft magnetic powdered composite) of the tooth end, it is namely possible to introduce the permanent magnetic flux of the ferrite magnets in a reliable, low-loss fashion into the tooth neck and thus into the stator—even if in the optimized case with regard to the power and torque density, the ferrite magnets must have a significantly larger cross-sectional area in comparison to the tooth neck. The tooth shape according to the invention, therefore, explicitly for the motor concept of disc rotor motors with ferrite magnets, results in a compact and weight-reducing design with nevertheless high power and torque densities and a high efficiency. It is thus possible to open up a previously unknown potential application for such a disc rotor motor in automotive engineering.

In general, it should be noted that SMC ("soft magnetic composites") can be particularly suitable as the soft magnetic powdered composite.

Surprisingly, it has been possible to determine that the contrary optimization parameters of weight and size as well as power and torque density find an optimum if the quotient of the largest cross-sectional area of the tooth end and the smallest cross-sectional area of the tooth neck is greater than 2. This also yields an easy-to-apply design rule for this disc rotor motor.

If the tooth neck and tooth end are composed of the same soft magnetic powdered composite, then it is possible to simplify the manufacture of the stator. In particular, SMC can be suitable for use as the soft magnetic powdered composite.

Magnetic losses can be reduced even further if the tooth neck and tooth end, manufactured as one, form an integral component of the stator. In addition, this can result in simpler circumstances when assembling the stator in that only after a winding of the one-piece stator tooth is the latter attached to the magnetically conductive stator yoke of the stator, for example by means of material adhesion and/or form-fitting measures between the two assembly components.

Alternative to the one-piece design of the stator tooth, it is also conceivable for the tooth end to be placed onto the tooth neck and fastened to it in order to permit a winding of the tooth neck.

This option of winding the stator teeth before the tooth end is attached to the tooth neck also opens up the possibility of manufacturing the stator in a simply designed way. It is then possible, namely, for the tooth neck and a one-piece or multi-piece stator yoke of the stator, manufactured as one, to form an integral component—which in turn simplifies the assembly of the disc rotor motor. In addition, the stator yoke and the tooth neck, because they are made of the same soft magnetic powdered composite, can have identical magnetic parameters, which can further simplify the design of the disc rotor motor.

A comparatively high power and torque density in the disc rotor motor can be achieved if the stator teeth and the ferrite magnets are arranged concentrically in the edge region of the stator and rotor.

If the rotor has a support disc with openings in the region of the ferrite magnets, then an increased mass of ferrite magnets can be fastened to the rotor and the rotor can nevertheless be embodied in a slim fashion. In particular, the use of stainless steel for the support disc can prove valuable in order to support a large number of ferrite magnets in a mechanically stable fashion. This can yield a durable disc rotor motor.

An increased number of ferrite magnets on the support disc can be provided in a simply designed way if a first ferrite magnet is inserted into an opening of the support disc and is covered on each of the two sides by a respective second ferrite magnet resting against the support disc. In addition to an improvement in the power and torque density of the disc rotor motor, this can also provide a reduced diameter of the rotor and thus further reduced dimensions of the disc rotor motor.

If the openings in the support disc have a stepped opening edge at both ends, then the fixed attachment of the ferrite magnets to the support disc can be embodied as mechanically tougher if the second ferrite magnets protrude into the stepped opening edge in an axially aligned fashion. As a result, not only is there a form-fitting connection between the ferrite magnets and the support disc, but also the second ferrite magnets can have a form-fitting connection with the support disc via the stepped opening edge. It is thus possible to produce a particularly tough and stable rotor, which in turn further increases the durability of the disc rotor motor.

The generation of eddy currents in the region of the openings of the support disc can be prevented if the support disc has slots in the edge region. Among other things, this can avoid a demagnetization of the ferrite magnets and can increase the durability of the disc rotor motor.

If the slots are formed between T-shaped partition pieces of the support disc, between which partition pieces the openings of the support disc for the ferrite magnets are located, then it is possible in a simply designed fashion to achieve a support disc in the form of a slotted spoked wheel. In addition to a weight reduction, this design can also produce advantageous magnetic conditions and increase the efficiency and the power and torque density of the disc rotor motor.

The support disc mechanically loaded with the ferrite magnets can have a circumferential groove in its end surface in which a reinforcing element is at least partially accommodated. The reinforcing element extending around the support disc can in particular counteract deformations in the partition pieces at the edges; a binding band has proven to be particularly useful here. It is therefore possible to assume that the disc rotor motor will have an increased durability.

In a weight-saving approach, the reinforcing element can have at least one fiber. In addition, this can prevent a short-circuiting of the edge regions of the support disc, which are separated from one another by the slots, and therefore has no negative influence on the efficiency and the power and torque density of the disc rotor motor. Fibers composed of a glass or carbon material can prove valuable for this purpose.

A comparatively high power and torque density in the disc rotor motor can be achieved if a stator is provided on each of the two sides of the rotor.

The structural embodiment of the disc rotor motor can be simplified if the rotor has a magnetically conductive support disc to which the ferrite magnets are fastened over their entire surface, with the stator that is provided on one side of the rotor adjoining the side of the support disc with the ferrite magnets via the axial gap. By comparison with a two-sided disc rotor motor, such a one-sided disc rotor motor can constitute the magnetic yoke through the support disc—consequently, the axial dimensions of the disc rotor motor can be significantly reduced by eliminating a second stator. In addition, this embodiment can also stand out due to its cost advantage.

The efficiency and the power and torque density of the disc rotor motor can be increased by providing the stator with a magnetically conductive stator yoke and a heat conductor, which has an increased thermal conductivity in comparison to the stator yoke and which, via a recess or opening of the stator yoke, rests against the coil of a wound tooth neck. It is thus possible, to specifically improve the cooling of the winding, which cooling can suffer under the tooth ends that encapsulate the winding.

This cooling can be further improved if the heat conductor is composed of aluminum or one of its alloys.

In the drawings, the subject of the invention is depicted in greater detail by way of example through a plurality of embodiment variants.

DETAILED DESCRIPTION OF THE PREFERRED EMBODIMENTS

Figure 1:
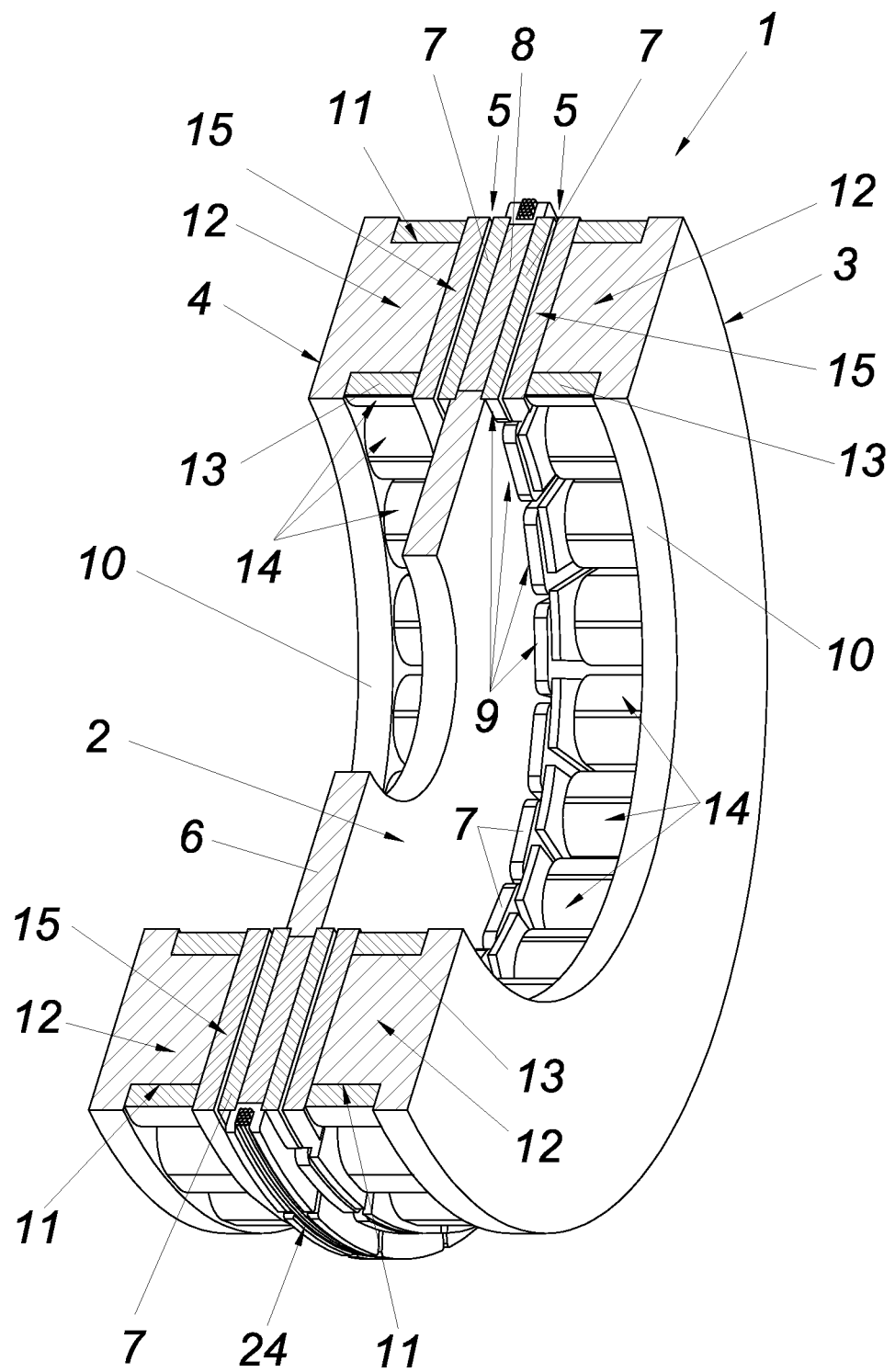
FIG. 1 is a three-dimensional view of a bisected two-sided disc rotor motor according to a first exemplary embodiment.

In the exemplary embodiment shown in FIG. 1, a two-sided disc rotor motor 1 is shown, which has a rotor 2 between two identically embodied stators 3, 4. The rotor 2 and the stators 3, 4 are oriented parallel to each other and are spaced apart from one another by a respective axial gap 5. As is clear from FIGS. 1, 2, and 4, the rotor 2 is disc-shaped, essentially influenced by its support disc 6. The support disc 6 is provided exclusively with ferrite magnets 7, 8 in order to produce permanent magnet-excited, torque-producing poles 9. It is also conceivable for these poles 9 to contribute to force generation, for example for the contactless support of the rotor 2, which is not shown in detail.

According to FIG. 1, each of the two identically embodied stators 3 and 4 is provided with a respective stator yoke 10, which ends in a plurality of parallel stator teeth 11. The stator teeth 11 or the tooth necks 12 are wound with coils 13 of a stator winding 14, which is preferably embodied with three phases (U, V, W) and, which is not shown in detail. As is clear when comparing to FIGS. 3 and 4, the maximum sum of the cross-sectional areas $A_H$ of the tooth necks 12 is less than the sum of the pole areas, which are composed of the cross-sectional areas $A_F$ of the associated ferrite magnets 7, 8. The ferrite magnets 7, 8 protrude significantly beyond the tooth necks 12 of the stators 3, 4 because the energy density of the ferrite magnets 7, 8, which is reduced in comparison to permanent magnets made of rare earth, must be compensated for—according to the invention, exclusively ferrite magnets 7, 8 must enable the production of the same power and torque density in the disc rotor motor 1. Despite the embodiment of the tooth neck 12 of the stator 3, 4 composed of a soft magnetic powdered composite, preferably SMC, this requires, as is known from the prior art, a significant overall size of the disc rotor motor 1—namely in its diameter. In order to reduce this disadvantage, which is particularly relevant with the cramped installation space in automotive engineering, the stator teeth 11 each end in a tooth end 15, which adjoins their tooth neck 12 and whose cross-sectional area $A_E$ increases relative to the cross-sectional area $A_H$ of the tooth neck 12. This in combination with the embodiment of the tooth end 15 composed of a soft magnetic powdered composite, preferably SMC—the same as in the tooth neck 12—opens up other options for optimizing or reducing the overall size of the disc rotor motor 1. The particular material of the tooth end 15 specifically permits a three-dimensional magnetic flux guidance so that the stator tooth 11 can be matched to the size of the ferrite magnets 7, 8 and thus yields an option for further optimizing or reducing the overall size of the disc rotor motor 1. This achieves a disc rotor motor 1, which despite the exclusive use of ferrite magnets 7, 8 in the rotor 2, has a high power and torque density and can nevertheless be kept small in its dimensions. It is possible to dispense with high-cost permanent magnets made of rare earth. The inexpensive disc rotor motor 1 according to the invention can therefore be used even in automotive engineering, where there is usually a limited amount of available installation space.

Figure 2:
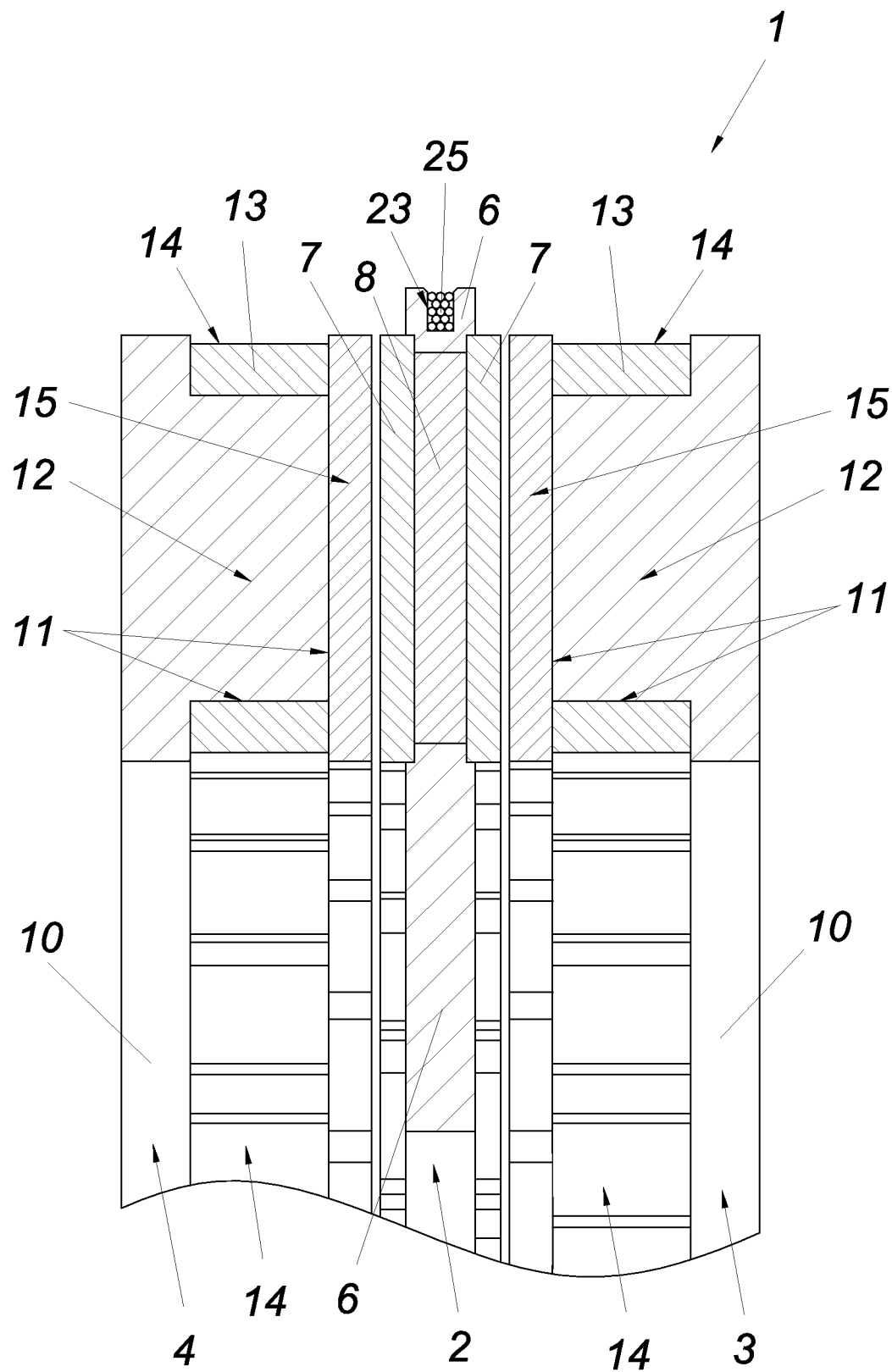
FIG. 2 is a cut-away, enlarged view of FIG. 1.
Figure 3:
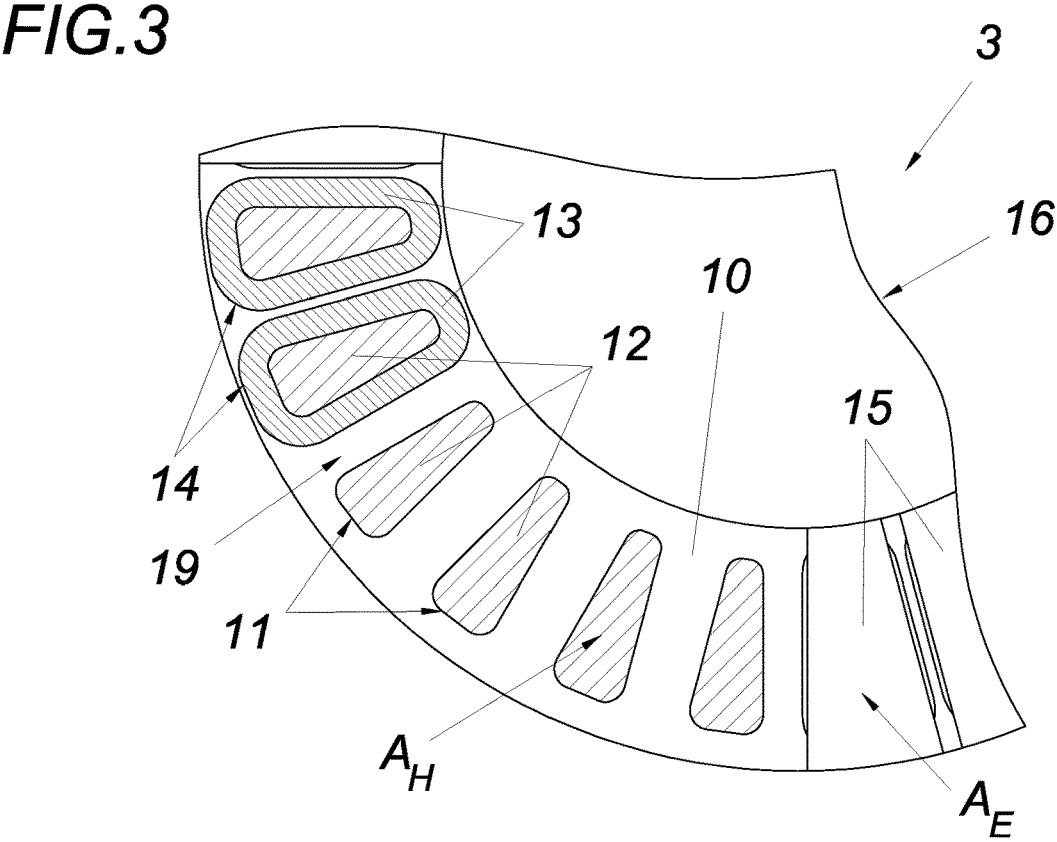
FIG. 3 is a dismantled and opened top view of a stator of the disc rotor motor according to FIG. 1.

The quotient of the largest cross-sectional area $A_E$ of the tooth end 15 and the smallest cross-sectional area $A_H$ of the tooth neck 12 is greater than 2, i.e. $(A_E/A_H)>2$. Thus FIGS. 2 and 3 show a cylindrical form of the tooth neck 12, which is adjoined by a tooth end 15 with a likewise cylindrical form. On the one hand, this measure provides a high efficiency as well as high power and torque densities and on the other hand, it provides extremely small dimensions of the disc rotor motor 1. In general, it should be noted that between the tooth neck 12 and tooth end 15, it is conceivable for there to be a form-fitting connection, but this is not shown in detail.

As is clear from FIGS. 1 and 2, the tooth end 15 is placed onto the tooth neck 12 and connected to it through material adhesion. A form-fitting connection, alternatively or additionally, is also conceivable, but this is not shown in detail. The 3-dimensional flux guidance of the tooth end 15 therefore adjoins the tooth neck 12 in a low-loss way and thus provides high power and torque densities.

As shown in FIG. 3, the tooth neck 12 and the one-piece stator yoke 10 of the stator 3, 4 form an integral component 16, which keeps losses in the magnetic flux guidance low. It is, however, entirely conceivable for the stator yoke 10 to be embodied as segmented in order to thus correspond to the technical requirements of press tools.

The stator teeth 11 and ferrite magnets 7, 8 are arranged concentrically in the edge region 19, 20 of the stator 3, 4 and rotor 2, as is evident in FIGS. 1 through 4. The disc rotor motor 1 can therefore produce a powerful torque, which is further boosted by the arrangement of a stator 3, 4 on each of the two sides of the central rotor 2.

The rotor 2 can take high rotation speeds without deforming because its support disc 6 is made of stainless steel. In addition, this support disc 6 has openings 17, one of which can be seen in its entirety in FIG. 4 since no ferrite magnets 7 and 8 of the rotor 2 are shown there. It is thus possible to avoid a damping of the magnetic flux due to the support disc 6. In addition, these openings 17 permit a stacking of the ferrite magnets 7 and 8. Thus a first ferrite magnet 8 is inserted into the opening 17 of the support disc 6 in a precisely fitting fashion. This first ferrite magnet 8 is covered on both sides by respective second ferrite magnets 7 that rest against the support disc 6. In the region of an opening 17, therefore, three ferrite magnets 7, 8 are provided, which ensures a high magnetic flux per permanent magnetic pole 9.

In addition, the openings 17 in the support disc 6 have a stepped opening edge 18 at both ends into which the second ferrite magnets 7 protrude in an axially aligned fashion, which significantly strengthens the fixed attachment to the outer ferrite magnets 7.

Figure 4:
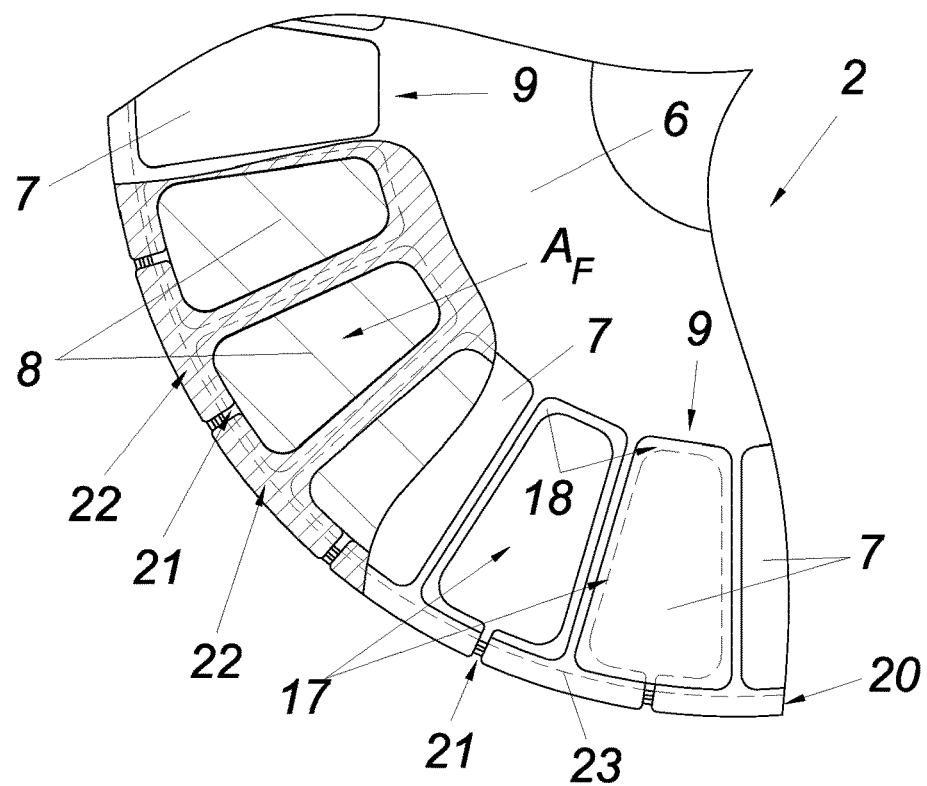
FIG. 4 is a dismantled and opened top view of the rotor of the disc rotor motor according to FIG. 1.

Also shown in FIG. 4, there are slots 21 in the edge region 20 of the support disc 6 in order to reduce eddy currents and thus losses in the support disc 6. These slots 21 are formed between T-shaped partition pieces 22 of the support disc 6, which also, in order to simplify the design, adjoin the openings 17 of the support disc 6 for the ferrite magnets 7, 8.

For mechanical reinforcement, the support disc 6 has a circumferential groove 23 in its end surface, into which a reinforcing element 24 is inserted. This reinforcing element 24 functions as a binding band and is reinforced with fibers 25 composed of a glass or carbon material extending in the circumference direction, which ensures a high degree of durability and fatigue strength of the rotor 2 and of the disc rotor motor 1.

Figure 5:
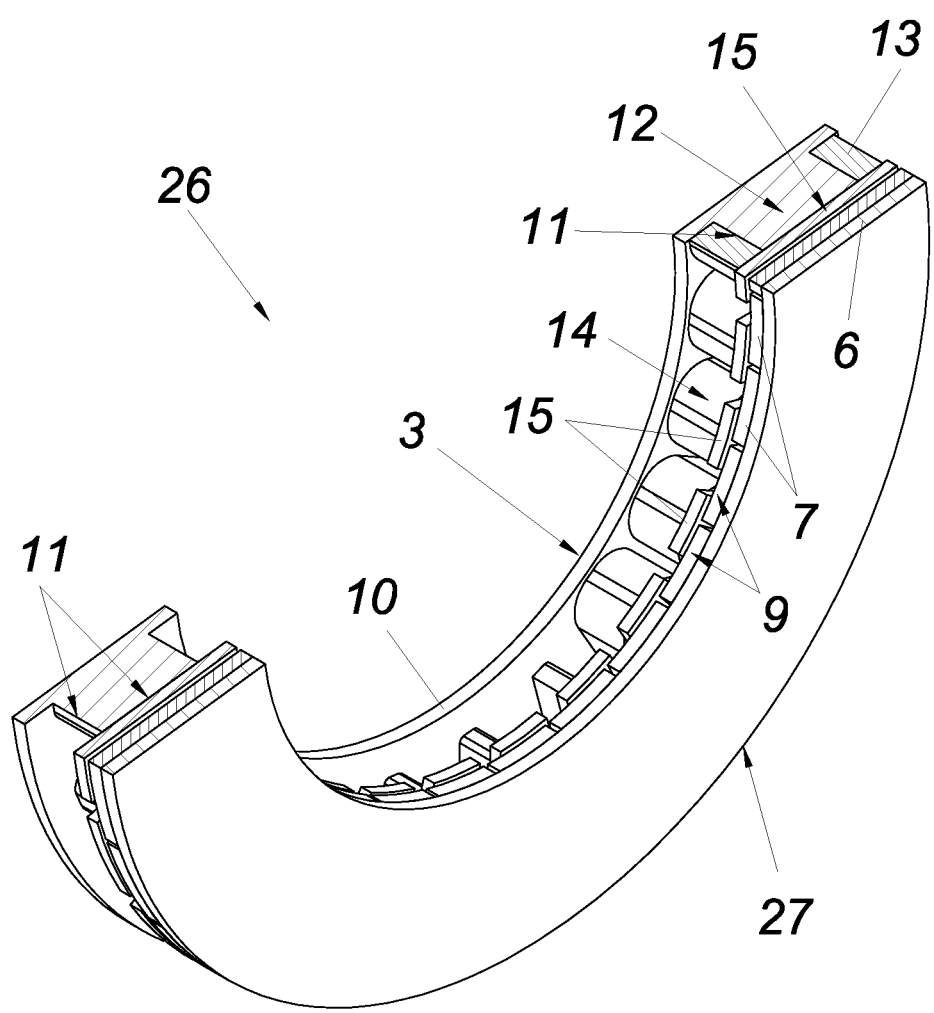
FIG. 5 is a three-dimensional view of a bisected one-sided disc rotor motor according to a second exemplary embodiment.
Figure 6:
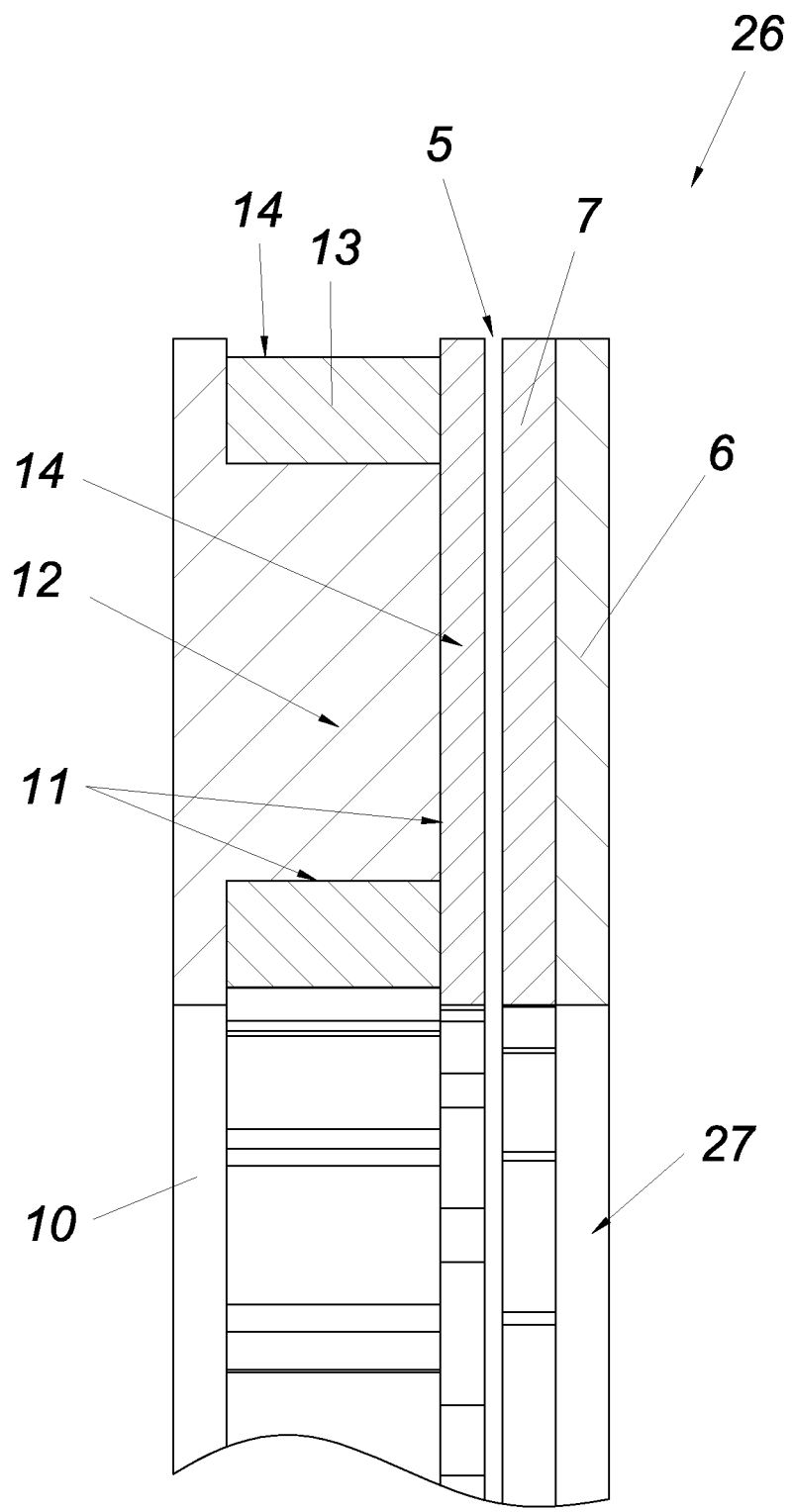
FIG. 6 is a cut-away, enlarged view of FIG. 5.

The disc rotor motor 26 shown in FIGS. 5 and 6, as a second exemplary embodiment, differs from the disc rotor motor 1 shown in FIGS. 1 through 4 essentially through its one-sided motor design. This difference manifests itself essentially in design changes to the rotor 27. In the rotor 27, it is clear that one ferrite magnet 7 is fastened to its support disc 6 for each magnetic pole 9. The support disc 6 is magnetically conductive and has no openings in order to concentrate the magnetic flux in the region of the ferrite magnets 7. As a result, the ferrite magnets 7 are fastened to the support disc 6 over their entire surface, preferably by means of material adhesion. Once again, an axial gap 5 is provided between the stator 3 and rotor 27, separating them from each other. The stator 3 of the disc rotor motor 26 is embodied identically to the stator 3 of the disc rotor motor 1, as shown by a comparison of FIGS. 1 and 5. The coils 13 of the stator winding 14 around the stator teeth 11 are not shown on the left side of the cut-open disc rotor motor 26 for the sake of clarity and in order to give a better view of the stator teeth 11. The disc rotor motor 26 according to FIGS. 5 and 6, due to its relatively short overall length, makes it possible to produce extremely compact electrical drives.

In general, it should be noted that for all of the exemplary embodiments, it is not absolutely necessary for all of the stator teeth 11 to be wound.

Figure 7:
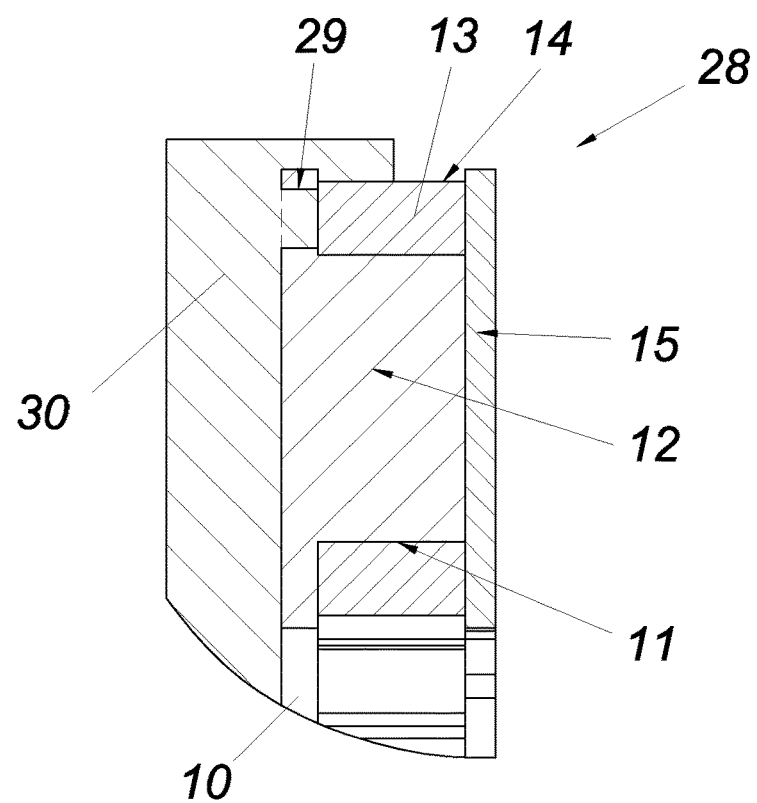
FIG. 7 shows an alternative embodiment of a stator with a heat conductor.

FIG. 7 shows an alternative embodiment for a stator 28, which by contrast with the stators in FIGS. 1, 2, 3, 5, and 6, has an opening 29 for a heat conductor 30. This opening 29 is provided in the stator yoke 10 of the stator and makes it possible to attach the heat conductor 30 to the base of the coil 13 of the winding of the stator tooth 11 in order to better dissipate the lost heat of the coil 13. The cooling of the coil 13 can suffer specifically due to the covering action of the tooth end. This increases the efficiency and the power and torque density of the disc rotor motor 1, 26. In addition, the heat conductor 30, which has an increased thermal conductivity to the stator yoke 10, adjoins the coil 13 laterally in some regions, which further improves the cooling, but does not hinder the interconnection of the coils 13. The heat conductor 30 is composed of aluminum, but can also be composed of any other thermally conductive material. In addition, the heat conductor 30 can serve as a support or housing for the stator 28 by enclosing the stator yoke, as shown in FIG. 7. This yields a durable disc rotor motor 1, 26.

Figure 8:
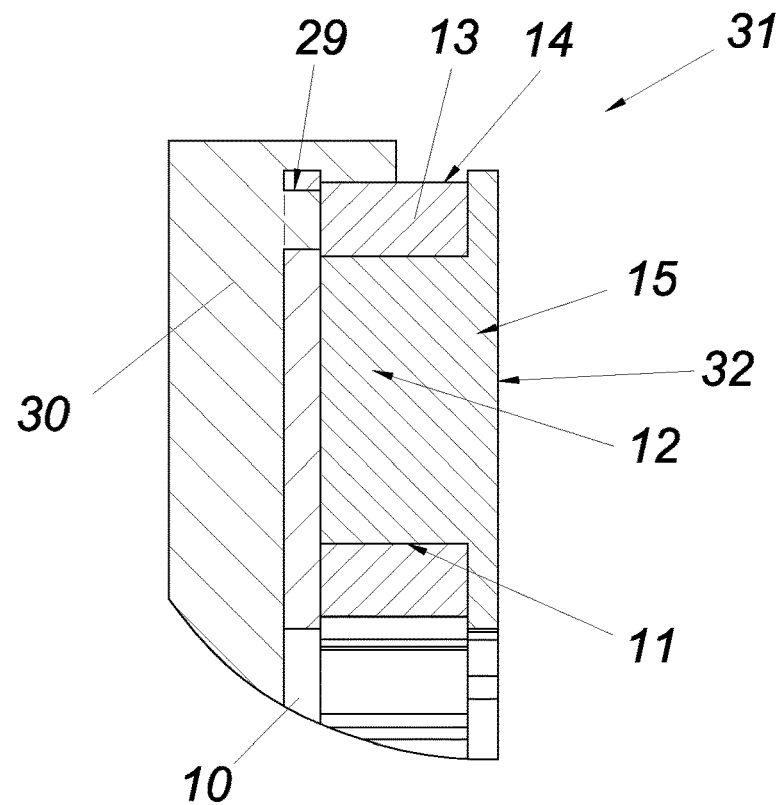
FIG. 8 shows an alternative embodiment of a stator with regard to its stator tooth and stator yoke.

FIG. 8 shows another alternative embodiment of a stator 31 with regard to its stator tooth 11 and stator yoke 10. The tooth neck 12 and tooth end 15, manufactured as one, specifically form an integral component 32 of the stator 31. The component 32 thus constitutes the entire stator tooth 11. This component 32 is attached to the magnetically conductive stator yoke 10 of the stator 31 by means of material adhesion and/or in a form-fitting way. As a result less magnetic loss occurs between the tooth neck 12 and tooth end 15.

The invention claimed is:

1. A disc rotor motor, comprising:
   at least one stator that has at least one electrical stator winding and a plurality of stator teeth composed of a soft magnetic powder composite, each of the stator teeth having a tooth neck and a tooth end that adjoins a respective tooth neck, wherein each tooth end widens out in its cross-directional area in comparison to the respective tooth neck and a quotient of a largest cross-sectional area of soft magnetic powder composite of the tooth end ($A_E$) and a smallest cross-sectional area of soft magnetic powder composite of the respective tooth neck ($A_H$) is greater than 2, such that ($A_E/A_H$)>2; and
   at least, one disc-shaped rotor comprising permanent magnetic poles for, producing torque, wherein the permanent magnetic poles are generated by magnets consisting of ferrite magnets, and the rotor and stator are oriented parallel to each other and spaced apart from each other by an axial gap, wherein a maximum sum of the cross-sectional areas of the tooth necks ($A_H$) composed of soft magnetic powder composite are less than a sum of cross-sectional areas ($A_E$) of the permanent magnetic poles composed of ferrite magnets.

2. The disc rotor motor according to claim 1, wherein the tooth neck and tooth end are composed of the same soft magnetic powdered composite.

3. The disc rotor motor according to claim 2, wherein the tooth neck and tooth end, manufactured as one, form art integral component of the stator, which component is attached to a magnetically conductive stator yoke of the stator.

4. The disc rotor motor according to claim 1, wherein the tooth end is placed onto the tooth neck and attached to the tooth neck.

5. The disc rotor motor according to claim 1, wherein the tooth neck and a one-piece or multi-piece stator yoke of the stator, manufactured as one, form an integral component.

6. The disc rotor motor according to claim 1, wherein the stator teeth are arranged concentrically in an edge region of the stator, and/or the ferrite magnets are arranged concentrically in an edge region of the rotor.

7. The disc rotor motor according to claim 1, wherein the rotor has a support disc composed of stainless steel, with openings in a region of the ferrite magnets.

8. The disc rotor motor according to claim 7, wherein a first ferrite magnet is inserted into each opening of the support disc and is covered on both sides by respective second ferrite magnets that rest against the support disc.

9. The disc rotor motor according to claim 8, wherein the openings in the support disc have a stepped opening edge at both ends, into which the second ferrite magnets protrude in an axially aligned fashion.

10. The disc rotor motor according to claim 7, wherein the support disc has slots in an edge region.

11. The disc rotor motor according to claim 10, wherein the slots are formed between T-shaped partition pieces of the support disc, and the slots adjoin the openings formed by the T-shaped partition pieces of the support disc for the ferrite magnets.

12. The disc rotor motor according to claim 7, wherein the support disc has a circumferential groove in its end surface in which a reinforcing element, in the form of a binding band, is at least partially accommodated.

13. The disc rotor motor according to claim 12, wherein the reinforcing element has at least one fiber composed of a glass or carbon material.

14. The disc rotor motor according to claim 7, wherein a stator s provided on each of two sides of the rotor.

15. The disc rotor motor according to claim 1, wherein the rotor has a magnetically conductive support disc to which the ferrite magnets are fastened over their entire surface, with the stator that is provided on one side of the rotor adjoining the side of the support disc with the ferrite magnets via the axial gap.

16. The disc rotor motor according to claim 1, wherein the stator has a magnetically conductive stator yoke and a heat conductor, which has an elevated thermal conductivity in comparison to the stator yoke and, via a recess or opening of the stator yoke, rests against a coil of a wound tooth neck.

17. The disc rotor motor according to claim 16, wherein the heat conductor is composed of aluminum or an aluminum alloy.

* * * * *

UNITED STATES PATENT AND TRADEMARK OFFICE
CERTIFICATE OF CORRECTION

PATENT NO.         : 10,651,695 B2
APPLICATION NO.    : 14/460854
DATED              : May 12, 2020
INVENTOR(S)        : Ralf Kobler et al.

Page 1 of 1

It is certified that error appears in the above-identified patent and that said Letters Patent is hereby corrected as shown below:

In the Claims

Column 7, Line 35, in Line 2 of Claim 3, "art" should read --an--.

Signed and Sealed this
First Day of September, 2020

Andrei Iancu
*Director of the United States Patent and Trademark Office*